United States Patent [19]

Proud

[11] 4,092,645
[45] May 30, 1978

[54] RADAR JAMMER HOMING CIRCUIT

[75] Inventor: William H. Proud, Culver City, Calif.

[73] Assignee: Hughes Aircraft Company, Culver City, Calif.

[21] Appl. No.: 509,500

[22] Filed: May 19, 1955

[51] Int. Cl.$^2$ ............................................. G01S 7/36
[52] U.S. Cl. ................................. 343/18 E; 343/7.4; 343/117 R
[58] Field of Search ............... 343/7.4, 18, 117, 18 R, 343/18 E

[56] References Cited

U.S. PATENT DOCUMENTS

| | | | |
|---|---|---|---|
| 2,910,691 | 10/1959 | Rhyins | 343/18 E |
| 4,010,469 | 3/1977 | Marcum | 343/18 E |

Primary Examiner—Maynard R. Wilbur
Assistant Examiner—Lawrence Goodwin
Attorney, Agent, or Firm—Lawrence V. Link, Jr.; W. H. MacAllister

EXEMPLARY CLAIM

1. In a fire control radar system of the character which produces radar signals having a predetermined repetition period and which includes coupled in cascade; an intermediate frequency amplifier, a second detector, a video amplifier, a junction, an angle tracking gate, a selective switch, an angle tracking amplifier and integrating circuit, and an error detecting circuit for providing antenna control signals; and including also an automatic gain control loop coupled between the selective switch and the intermediate frequency amplifier; the system being adapted to automatically home on radar signals reflected off a distant object; the combination therewith of means for homing on signals emanating from the distant object, said means comprising: a jammer gate circuit coupled between the junction and the selective switch and being adapted to pass to said selective switch signals impressed on said jammer gate circuit from said junction during the application of a long enabling pulse which is applied during the latter portion of the repetition period.

6 Claims, 3 Drawing Figures

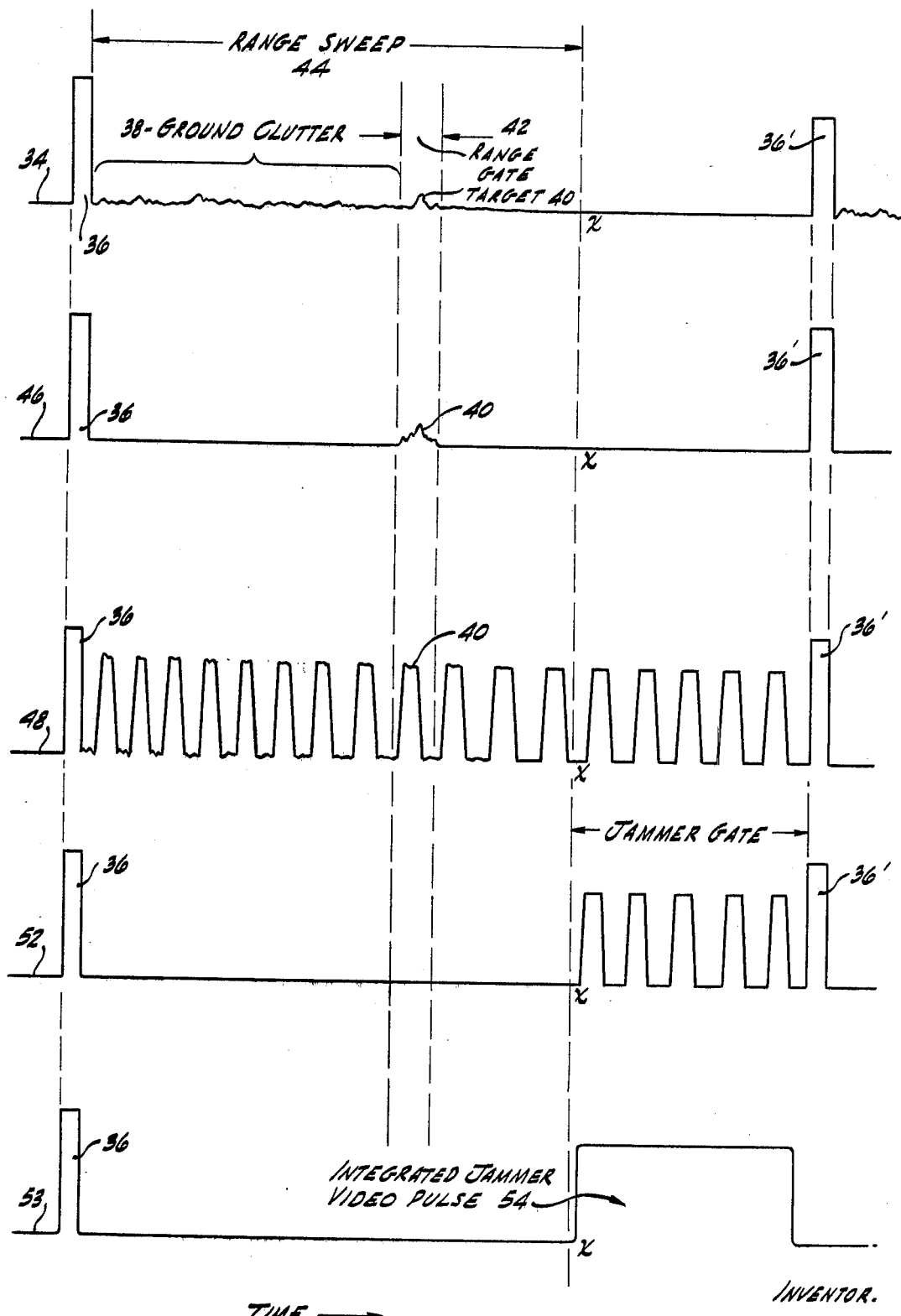

RADAR JAMMER HOMING CIRCUIT

This invention relates to radar counter-countermeasures and more particularly to a system which provides automatic angle tracking information in order that a radar fire control system may automatically angle track, or home, on an enemy jamming signal which would otherwise prevent fire control angle tracking.

In the present state of the radar countermeasures art one of the most efficient and effective techniques of jamming an interceptor's fire control radar is for the enemy to provide a continuous wave type of jamming signal from the enemy craft. The continuous wave may be noise modulated, be of the pulse railing type or may be a true continuous wave, transmitted from the enemy craft at the frequency of the interceptor radar through a low gain or omnidirectional antenna. The jamming signal may be set on frequencies at which the radar is likely to operate, it may be kept on the frequency of specific radars by automatic frequency control circuits, or it may be swept through the radar spectrum at some predetermined rate. The jamming may be effective by saturation of signal channel circuits, including the tracking circuits and indicator, or by adding extraneous signals that will unlock the range gate and cause a consequent loss of angle tracking. In addition, the presence of high level, high duty cycle jamming may simply mask a low level target echo.

The problem which is solved by this invention is that of homing on either the true echo signal or the enemy's jamming signal when the enemy is attempting to jam the interceptor's radar fire control.

It is therefore an object of this invention to provide a method for homing on an enemy jamming signal.

It is another object to provide a system which when added to a conventional fire-control radar provides automatic angle tracking on either the enemy jammer or echoes from the enemy object.

It is a further object to provide such a system which can be utilized against a variety of types of enemy radar countermeasures.

Briefly, in accordance with this invention these objects are achieved in the following manner: A relatively long angle tracking gate must be provided to insure that when a steady, continuous wave jamming signal is used, enough of the jamming energy from the jammer will be provided to the angle tracking amplifier and integration circuits for successful angle tracking of the jamming signal. When the jamming signal has a low duty cycle, the gate must be wide enough to insure a high probability of "catch". The gate signal is placed in time corresponding to long range to minimize the amount of ground clutter return entering the tracking circuits, thereby minimizing the angle tracking errors produced by ground clutter signals. A convenient time to initiate the homing gate is at the end of the range sweep. Separate gate generation circuits, triggered by the end of the range sweep, may be employed; or, for economy of design, the gate may be derived from the indicator blanking voltage. The choice is influenced by such considerations as the indicator on and off time and whether the normal angle tracking gate circuit will respond properly to long enabling gate pulses or whether a separate homing gate circuit is necessary.

During a homing operation on the enemy jammer an audio frequency voltage may be used to modulate the i-f signal to counter unmodulated continuous wave jamming which would otherwise produce a dc (direct current) voltage when detected and thus not pass through coupling capacitors to the tracking circuits. Alternatively, a synchronous chopping circuit may be utilized to similarly adapt the received signals. For noise modulated or railing type of cw (continuous wave) jamming, there is no need for either type of internal modulating circuit, although neither circuit would deleteriously affect the operation of this invention when the latter types of jamming are being countered.

The novel features which are believed to be characteristic of the invention, both as to its organization and method of operation, together with further objects and advantages thereof, will be better understood from the following description considered in connection with the accompanying drawings in which some embodiments of the invention are illustrated by way of example. It is to be expressly understood, however, that the drawings which imply that the invention is being used in a specific tracking system are for the purpose of illustration and description only, and are not intended as a definition of the limits of the invention.

In the drawings:

FIG. 2 is a time-pulse diagram to aid in explanation of the operation of the invention.

Figure 1:
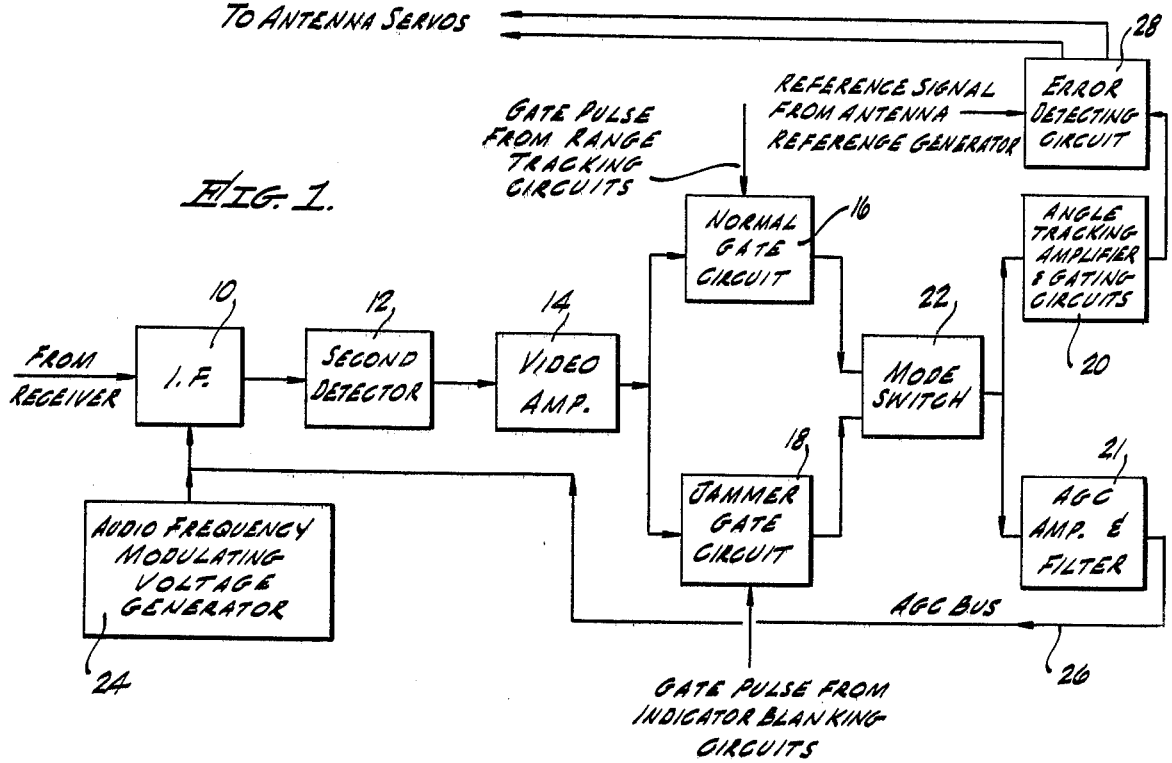
FIG. 1 is a block diagram of that part of a conventional radar receiver to which has been added the circuitry of this invention.

Referring now to FIG. 1 radar receiver signals are impressed upon radar *if* (intermediate frequency) strip 10 in a conventional manner from a radar mixer. The output terminal *if* of the strip is in turn connected to second detector 12. A video amplifier 14 is coupled to the second detector output. The video output of amplifier 14 is impressed upon a normal angle tracking gate circuit 16 and jammer gate circuit 18. The common input terminal of conventional angle tracking amplifier and integration circuits 20 and automatic gain control circuit 21 is selectively coupled to either the output of jammer gate circuit 18 or gate circuit 16 by the action of mode switching relay 22. Audio frequency modulation voltage generator 24 is coupled to the automatic gain control bus 26 of radar *if* strip 10 which is coupled thereby to automatic gain control circuit 21. Impressed upon normal angle tracking gate circuit 16 in a conventional manner are gate pulses from the range tracking circuits; while impressed upon jammer gate circuit 18 are the long gate pulses from the indicator blanking circuits. The gate circuit used may be any one of a number of conventional types with the following provisos: the gate circuit should be capable of having a long "on" time; the gate enabling pulse should not add a pedestal to the output signal; and during the "on" time the gate circuit should be linear.

Audio frequency generator 24 while not critical as to frequency should be at least five times the conical scan frequency or the low frequency cutoff of the automatic gain control loop whichever is the highest. Also, frequencies that produce low frequency beats with the radar pulse repetition rate obviously must be avoided.

Error detecting circuits 28 are coupled to the output terminal of circuits 20 and to a conventional antenna reference signal generator. Output leads 30 and 32 are coupled from error detecting circuit 28 to a conventional antenna servo system.

For purposes of explanation of operation of the above example of one embodiment of the invention it will first be assumed that a continuous, pulse railing type of jamming signal is to be countered. With reference to FIGS. 1 and 2, Graph 34 represents a typical radar receiver second detector output with pulse height plotted versus time. Video pulses 36 and 36' represent the radar main bang pulses and, accordingly, set off the beginning of each period of operation of the radar. Signals 38 represent ground clutter, and target 40 is an enemy object illuminated by the radar which is sought to be angle tracked and range tracked. Assume further that target 40 carries radar jamming equipment of the type above mentioned. Range gate 42 is positioned to include target 40 and range sweep 44 is seen to extend from the main bang 36 to a time $x$. Accordingly, the time extending from $x$ to main bang 36' represents that period of the radar repetition rate period which is not utilized for measuring distances to targets. Graph 34 represents the output of second detector 12.

Since it is desired to automatically point the antenna toward target 40, the scan modulation on the signal 40 only is desired to be detected and utilized to so control the antenna. Therefore, when signals as represented by Graph 34 are applied to normal gate circuit 16 the output thereof is a signal as represented by Graph 46, the time of the selection of signal 40 being made by the range tracking circuits. Pulse stretching may be accomplished either in the gate circuit or in angle track amplifier and integration circuits 20.

Under the above conditions, i.e. normal operation, with no enemy jamming being exerted, mode switch 22 couples gated signal 40 to the conventional angle tracking amplifier and integration circuits 20, and thence to error detecting circuit 28 for providing signals for controlling the antenna positioning.

Next assume that the enemy object represented as target 40 begins a jamming technique of the character above described, i.e., pulse railing. In such a case Graph 48 represents the output of second detector 12. As may be seen from Graph 48, the video signals of Graph 34 are substantially superimposed upon the jamming signal. For a number of reasons it may no longer be possible to either detect or angle track on information from the signal 40. This type of jamming not only saturates the indicator, making it difficult to detect adjacent or superimposed targets, but also may have the effect of unlocking the range gate, thereby sampling the video signal for the angle tracking circuits at an improper time, or range. Graph 52 represents the output of the jammer gate circuit 18. The gated jamming video pulse 54 is of long duration, because the jammer gate circuit 18 has a duty cycle greater than 0.1. Since the jamming signal is coming directionally from the enemy object, video pulse 54, when integrated and properly automatic gain controlled, may then be angle tracked in place of the real target signal 40. In this case the output of jammer gate circuit 18, through the operation of mode switch 22, is caused to be applied to the circuits 20 and 21.

In the case of a pure continuous wave, unmodulated radar jamming technique which is attempted after lock-on when the antenna is pointed directly toward the target, the second detector 12 would provide a steady dc output instead of the signal shown in Graph 48 and which would be blocked by coupling capacitors in video amplifier 14. For this reason audio frequency modulating voltage generator 24 as above set out modulates the second detector output. In the case assumed in the example above, the homing action is neither aided nor harmed by the audio frequency modulation.

Figure 3:
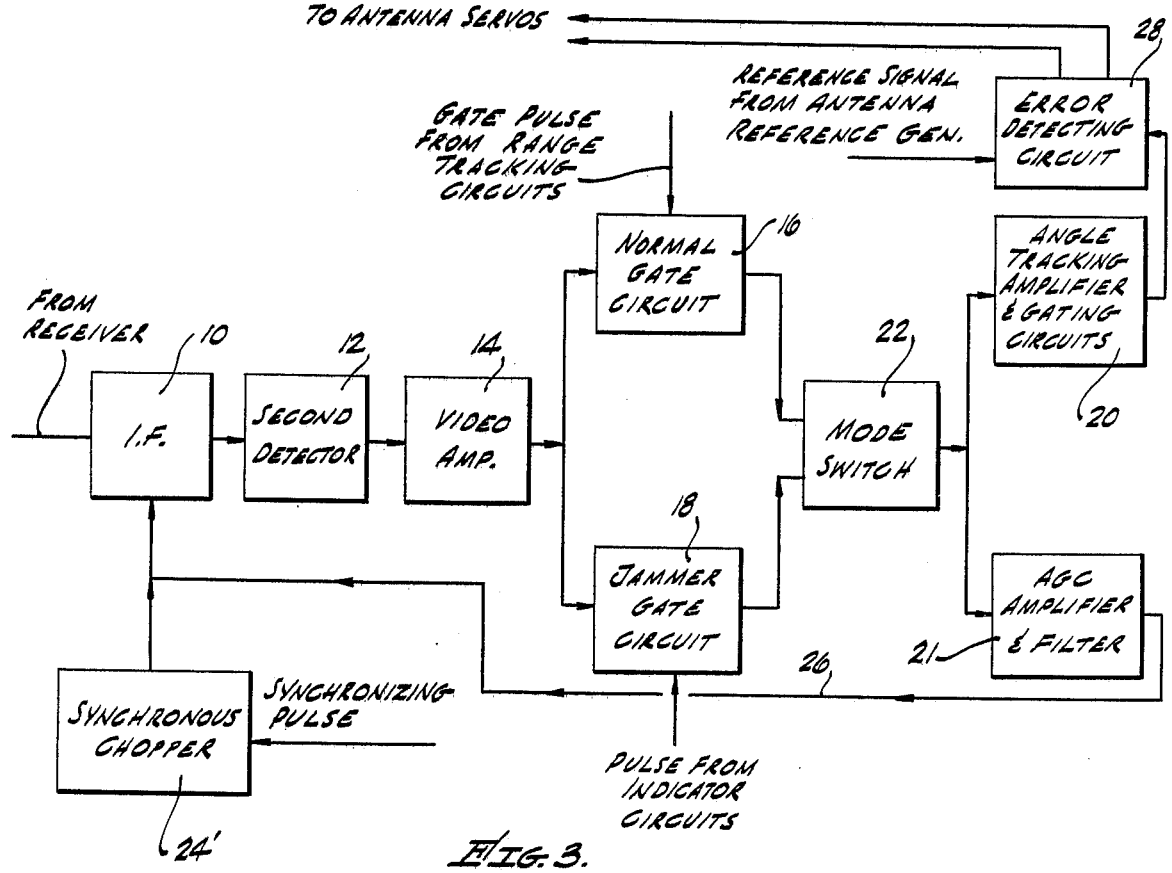
FIG. 3 is a block diagram of a modified embodiment of the invention.

Referring to FIG. 3, there is shown an embodiment utilizing a synchronous chopper circuit as above described to similarly adapt the jamming signal so that it will not be blocked from passing through coupling capacitors. In FIG. 3 audio generator 24 is replaced by synchronous chopper 24' which periodically impresses a large negative signal upon $if$ amplifier 10 through automatic gain control bus 26. Synchronous chopper 24' may be any conventional chopping circuit adapted to provide such a chopping signal in response to a synchronizing signal from any suitable point in the radar system.

Similarly, jammer gate circuit 18 may be adapted to generate in a conventional manner its own enabling pulse from any synchronized signal applied from any appropriate point in the system.

It may be seen that the action of mode switch 22 may be made automatic; the decision making circuits would operate from the integrated dc voltage appearing at the output of second detector 12 when jamming signals are present. Such an automatic feature would be especially effective in countering swept-type jammers with which an enemy sweeps the radar spectrum slowly enough so that each interceptor's radar is "unlocked" as the jammer frequency sweeps across each interceptor's frequency band. With automatic mode switching, the interceptor is able at all times to selectively track on either a jamming signal or echo signal whichever is the more suitable. Also, the switching may be accomplished at other points in the system, e.g. at the input to the gate circuits.

A further advantage of the present invention is that it is inherently capable of performing as a navigation aid wherein low power cw beacons are homed upon.

What is claimed is:

1. In a fire control radar system of the character which produces radar signals having a predetermined repetition period and which includes coupled in cascade; an intermediate frequency amplifier, a second detector, a video amplifier, a junction, an angle tracking gate, a selective switch, an angle tracking amplifier and integrating circuit, and an error detecting circuit for providing antenna control signals; and including also an automatic gain control loop coupled between the selective switch and the intermediate frequency amplifier; the system being adapted to automatically home on radar signals reflected off a distant object; the combination therewith of means for homing on signals emanating from the distant object, said means comprising: a jammer gate circuit coupled between the junction and the selective switch and being adapted to pass to said selective switch signals impressed on said jammer gate circuit from said junction during the application of a long enabling pulse which is applied during the latter portion of the repetition period.

2. The combination of means according to claim 1 which further comprises: an audio frequency modulating voltage generator coupled to the automatic gain control loop.

3. The combination of means according to claim 1 which further comprises: a synchronous chopper coupled to the automatic gain control loop and being adapted to impress thereon a negative chopping voltage responsive to a synchronized pulse.

4. A radar counter-countermeasures system comprising: conventional intermediate frequency amplifying means; a second detector coupled thereto for rectifying the output signals of said means; a video amplifier coupled to said detector; a normal angle tracking gate circuit coupled to said video amplifier and being adapted to reject, responsive to a conventional range gate pulse, all signals except those representative of targets within a predetermined range; a jammer gate circuit also coupled to said video amplifier and being adapted to reject, responsive to a conventional indicator blanking pulse, all signals representative of objects and targets within the range of the system; angle tracking amplifier and integrator circuits; an automatic gain control circuit; a mode switch coupled to said angle tracking circuit and to said automatic gain control circuit and selectively coupled to one of said gate circuits; an automatic gain control bus coupled between said automatic gain control circuit and said intermediate frequency amplifier; an error detecting circuit coupled to said angle tracking amplifier and integrating circuit and adapted to provide signals suitable for controlling the orientation of a directional antenna.

5. A radar counter-countermeasures system according to claim 4 which further comprises: an audio frequency modulating voltage generator coupled to said automatic gain control bus.

6. A radar counter-countermeasures system according to claim 4 which further comprises: a synchronous chopper coupled to said automatic gain control bus and being adapted to impress negative chopping signals upon said automatic gain control bus responsive to a synchronized signal.

* * * * *